(12) United States Patent
Dion et al.

(10) Patent No.: US 9,951,725 B2
(45) Date of Patent: *Apr. 24, 2018

(54) EGR CONSTRUCTIONS FOR OPPOSED-PISTON ENGINES

(71) Applicant: ACHATES POWER, INC., San Diego, CA (US)

(72) Inventors: Eric P. Dion, Encinitas, CA (US); Iain J. L. Read, Warren, MI (US); Fabien G. Redon, San Diego, CA (US); Gerhard Regner, San Diego, CA (US); Michael H. Wahl, Bonita, CA (US)

(73) Assignee: ACHATES POWER, INC., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/215,940

(22) Filed: Jul. 21, 2016

(65) Prior Publication Data

US 2016/0326993 A1   Nov. 10, 2016

Related U.S. Application Data (63) Continuation of application No. 14/039,856, filed on Sep. 27, 2013, now Pat. No. 9,410,506, which is a
(Continued)

(51) Int. Cl.
*F02B 33/44* (2006.01)
*F02B 75/04* (2006.01)
(Continued)

(52) U.S. Cl.
CPC ............ *F02M 26/41* (2016.02); *F02B 25/08* (2013.01); *F02B 29/0475* (2013.01);
(Continued)

(58) Field of Classification Search
CPC ........ F02M 26/41; F02M 26/01; F02B 25/08; F02B 29/0475; F02B 37/183; F02B 2075/025; F02B 2275/14; F02F 1/186
(Continued)

(56) References Cited

U.S. PATENT DOCUMENTS

| 2,025,177 | A |   | 12/1935 | Pateras Pescara | .......... 123/46 R |
| 2,168,096 | A | * | 8/1939 | Ehrlich | .................. F02B 25/00 |
|  |  |  |  |  | 123/51 B |

(Continued)

FOREIGN PATENT DOCUMENTS

| AT | 514054 B1 | 1/2015 |
| DE | 19840554 A1 | 3/1999 |

(Continued)

OTHER PUBLICATIONS

Hofbauer, P., et al, *MTZ Worldwide*, "Opposed-Piston Opposed-Cylinder Engine for Heavy Duty Trucks", Apr. 2012, vol. 73, pp. 48-54.

(Continued)

*Primary Examiner* — Thai Ba Trieu
(74) *Attorney, Agent, or Firm* — Terrance A. Meador (57) ABSTRACT

A two-stroke, opposed-piston engine with one or more ported cylinders and uniflow scavenging includes an exhaust gas recirculation (EGR) construction that provides a portion of the exhaust gasses produced by the engine for mixture with charge air to control the production of NOx during combustion.

6 Claims, 5 Drawing Sheets

Related U.S. Application Data continuation of application No. 13/068,679, filed on May 16, 2011, now Pat. No. 8,549,854.

(60) Provisional application No. 61/395,845, filed on May 18, 2010, provisional application No. 61/401,598, filed on Aug. 16, 2010.

(51) Int. Cl.

| | | |
|---|---|---|
| *F02M 26/41* | (2016.01) | |
| *F02F 1/18* | (2006.01) | |
| *F02B 25/08* | (2006.01) | |
| *F02B 75/28* | (2006.01) | |
| *F02M 26/01* | (2016.01) | |
| *F02B 29/04* | (2006.01) | |
| *F02B 37/18* | (2006.01) | |
| *F02B 75/02* | (2006.01) | |

(52) U.S. Cl.
CPC ............ *F02B 37/183* (2013.01); *F02B 75/28* (2013.01); *F02F 1/186* (2013.01); *F02M 26/01* (2016.02); *F02B 2075/025* (2013.01); *F02B 2275/14* (2013.01)

(58) Field of Classification Search
USPC ......... 60/605.2, 605.1, 280; 123/46 R, 46 B, 123/52.2, 568.11–568.12
See application file for complete search history.

(56) References Cited

U.S. PATENT DOCUMENTS

| | | | |
|---|---|---|---|
| 2,522,118 A | 9/1950 | Guercken | 60/731 |
| 2,581,600 A | 1/1952 | Pateras | 123/46 R |
| 2,581,668 A | 1/1952 | Guercken | 60/605.1 |
| 2,583,430 A | 1/1952 | Guercken | 60/605.1 |
| 2,914,909 A | 12/1959 | Kubik | 60/595 |
| 2,963,008 A | 12/1960 | Waldrop | 123/46 A |
| 2,982,087 A | 5/1961 | Foster | 60/595 |
| 3,005,306 A | 10/1961 | Vannevar | 60/595 |
| 3,022,425 A | 2/1962 | Rockstead | 290/40 R |
| 3,130,716 A | 4/1964 | Creswick | 123/46 R |
| 3,146,765 A | 9/1964 | Vannevar | 123/46 R |
| 3,182,643 A | 5/1965 | Tenney | 123/51 R |
| 3,485,221 A | 12/1969 | Reeback | 123/51 AA |
| 4,090,479 A | 5/1978 | Kaye | 123/51 B |
| 4,372,256 A | 2/1983 | Firey | 123/46 A |
| 5,203,311 A | 4/1993 | Hitomi et al. | 123/559.1 |
| 5,307,632 A | 5/1994 | Gottemoller et al. | 60/608 |
| 5,509,394 A | 4/1996 | Hitomi et al. | 123/559.1 |
| 5,657,630 A | 8/1997 | Kjemtrup et al. | 60/605.2 |
| 5,771,867 A | 6/1998 | Amstutz et al. | 123/568.21 |
| 5,771,868 A | 6/1998 | Khair | 60/605.2 |
| 5,791,146 A | 8/1998 | Dungner | 60/605.2 |
| 5,906,098 A | 5/1999 | Woollenweber et al. | 60/608 |
| 5,974,792 A | 11/1999 | Lsobe | 60/285 |
| 6,041,602 A | 3/2000 | Dickey | 60/605.2 |
| 6,164,071 A | 12/2000 | Shao et al. | 60/605.2 |
| 6,170,443 B1 | 1/2001 | Hofbauer | 123/51 B |
| 6,216,460 B1 | 4/2001 | Shao et al. | 60/605.2 |
| 6,227,180 B1 | 5/2001 | Hoffmann et al. | 60/280 |
| 6,256,993 B1 | 7/2001 | Halimi et al. | 60/608 |
| 6,311,494 B2 | 11/2001 | McKinley et al. | 60/605.2 |
| 6,318,085 B1 | 11/2001 | Torno et al. | 60/611 |
| 6,354,084 B1 | 3/2002 | Mckinley et al. | 60/605.2 |
| 6,412,278 B1 | 7/2002 | Matthews | 60/605.2 |
| 6,435,166 B1 | 8/2002 | Sato et al. | 60/605.2 |
| 6,625,984 B2 | 9/2003 | Gerke et al. | 60/602 |
| 6,742,335 B2 | 6/2004 | Beck et al. | 60/605.2 |
| 6,851,256 B2* | 2/2005 | Chamoto | F02M 26/21 60/280 |
| 6,925,971 B1 | 8/2005 | Peng et al. | 123/46 R |
| 6,948,475 B1 | 9/2005 | Wong et al. | 121/299 |
| 6,955,162 B2 | 10/2005 | Larson et al. | 60/605.2 |
| 6,957,632 B1 | 10/2005 | Carlson et al. | 123/46 R |
| 7,043,914 B2 | 5/2006 | Ishikawa | 60/605.2 |
| 7,047,916 B2 | 5/2006 | Pischinger et al. | 123/46 R |
| 7,237,381 B2 | 7/2007 | Kolavennu et al. | 60/608 |
| 7,246,490 B2 | 7/2007 | Sumser et al. | 60/605.2 |
| 7,281,531 B1 | 10/2007 | Fulton et al. | 123/568.17 |
| 7,370,474 B2* | 5/2008 | Minami | F02M 26/10 60/286 |
| 7,444,804 B2 | 11/2008 | Hashizume | 60/280 |
| 7,490,594 B2 | 2/2009 | Van Dyne et al. | 123/559.1 |
| 7,784,436 B2 | 8/2010 | Lemke et al. | 123/51 R |
| 7,845,317 B2 | 12/2010 | Max et al. | 123/46 E |
| 7,886,528 B2 | 2/2011 | Danby et al. | 60/286 |
| 7,992,389 B2 | 8/2011 | Furman et al. | 60/608 |
| 8,127,544 B2 | 3/2012 | Schwiesow et al. | 123/46 R |
| 8,176,736 B2 | 5/2012 | Janssen | 60/605.2 |
| 8,522,551 B2* | 9/2013 | Tomita | F02B 37/004 60/612 |
| 8,549,854 B2 | 10/2013 | Dion et al. | 60/605.2 |
| 8,677,749 B2 | 3/2014 | Laimboeck et al. | 123/46 R |
| 8,789,499 B2 | 7/2014 | Alonso | 123/51 R |
| 8,806,869 B2* | 8/2014 | Petrovic | F02B 37/18 60/612 |
| 9,074,524 B2 | 7/2015 | Eybergen et al. | 33/38 |
| 2002/0078934 A1* | 6/2002 | Hohkita | F02B 37/183 60/602 |
| 2002/0174648 A1* | 11/2002 | Minami | F02M 26/53 60/297 |
| 2005/0257759 A1 | 11/2005 | Pischinger et al. | 123/46 R |
| 2006/0075995 A1 | 4/2006 | Liu et al. | 123/568.12 |
| 2008/0036312 A1 | 2/2008 | Max et al. | 310/46 |
| 2008/0115493 A1 | 5/2008 | Wolf et al. | 60/605.2 |
| 2008/0127947 A1 | 6/2008 | Hofbauer et al. | 123/51 R |
| 2009/0159022 A1 | 6/2009 | Chu | 123/52.2 |
| 2009/0173071 A1 | 7/2009 | Kapich | 60/605.2 |
| 2009/0194079 A1 | 8/2009 | Nagae et al. | 123/568.11 |
| 2009/0249783 A1 | 10/2009 | Gokhaie et al. | 60/602 |
| 2009/0260603 A1 | 10/2009 | Bucknell | 123/564 |
| 2009/0266339 A1 | 10/2009 | Cleeves | 123/48.008 R |
| 2010/0024414 A1 | 2/2010 | Hittle et al. | 60/602 |
| 2010/0147269 A1 | 6/2010 | Flowers et al. | 123/51 R |
| 2010/0293943 A1 | 11/2010 | Teng et al. | 60/602 |
| 2010/0293944 A1 | 11/2010 | Hunter | 60/605.2 |
| 2011/0022289 A1 | 1/2011 | Hofbauer | 701/103 |
| 2011/0056199 A1 | 3/2011 | Gokhale et al. | 60/602 |
| 2011/0114070 A1 | 5/2011 | Liu et al. | 123/590 |
| 2011/0289916 A1 | 12/2011 | Dion et al. | 60/605.2 |
| 2012/0037130 A1 | 2/2012 | Fuqua | 123/51 R |
| 2012/0046854 A1* | 2/2012 | Sangkyu | F02D 41/0057 701/108 |
| 2012/0112469 A1 | 5/2012 | Durrett et al. | 60/595 |
| 2012/0125298 A1 | 5/2012 | Lemke et al. | 121/51 B |
| 2012/0192559 A1 | 8/2012 | Laimboeck et al. | 60/605.1 |
| 2012/0210985 A1 | 8/2012 | Fuqua et al. | 121/51 B |
| 2012/0260894 A1 | 10/2012 | Hayman | 123/559.1 |
| 2012/0260895 A1 | 10/2012 | Hayean et al. | 123/559.1 |
| 2012/0266851 A1 | 10/2012 | Hofbauer et al. | 123/69 R |
| 2012/0298077 A1 | 11/2012 | Elsbett et al. | 123/51 R |
| 2012/0330534 A1 | 12/2012 | Cleeves et al. | 701/104 |
| 2013/0118441 A1 | 5/2013 | Levy et al. | 123/197.4 |
| 2013/0152547 A1 | 6/2013 | Hofbauer | 60/274 |
| 2013/0174548 A1 | 7/2013 | Dion | 60/605.2 |
| 2013/0232972 A1 | 9/2013 | Heierrmann | 60/605.2 |
| 2013/0333665 A1* | 12/2013 | Pursifull | F02B 37/04 123/399 |
| 2014/0026563 A1 | 1/2014 | Dion et al. | F02M 25/0747 |
| 2014/0102418 A1 | 4/2014 | Babu et al. | 123/51 R |
| 2014/0216411 A1 | 8/2014 | Holmes | 123/45 E |
| 2014/0331656 A1 | 11/2014 | Nagar et al. | 123/51 R |
| 2014/0373814 A1 | 12/2014 | Herold et al. | 123/51 B |
| 2014/0373815 A1 | 12/2014 | Nagar | 123/51 B |
| 2014/0373816 A1 | 12/2014 | Nagar | 123/51 B |

FOREIGN PATENT DOCUMENTS

| | | |
|---|---|---|
| DE | 19809618 A1 | 9/1999 |
| DE | 10331187 A1 | 2/2005 |
| DE | 102012103389 A1 | 10/2012 |

(56) References Cited

FOREIGN PATENT DOCUMENTS

| | | | | |
|---|---|---|---|---|
| GB | 1450815 | | 9/1976 | |
| JP | 04175449 | A | 6/1992 | |
| JP | 06123259 | A | 5/1994 | |
| JP | 2001073741 | A | 3/2001 | |
| JP | 2009115089 | A | 5/2009 | |
| JP | 2011007456 | A1 * | 1/2011 | ............. F02B 37/18 |
| JP | 2011157959 | A | 8/2011 | |
| JP | 2012/180814 | | 9/2012 | |
| JP | 2013007295 | A | 1/2013 | |
| JP | 2014122575 | A | 7/2014 | |
| RU | 2193674 | C1 | 11/2002 | |
| WO | WO 2008071810 | A1 * | 6/2008 | ............. F02M 26/34 |
| WO | WO 2010012919 | A1 * | 2/2010 | ............. F02M 26/34 |
| WO | WO 2011/062618 | A1 | 5/2011 | |
| WO | WO 2011/146111 | A1 | 11/2011 | |
| WO | WO 2012/067643 | A1 | 5/2012 | |
| WO | WO 2013/126347 | A1 | 8/2013 | |
| WO | WO 2014/134417 | | 9/2014 | |

OTHER PUBLICATIONS

Pirault, J and Flint, M. *Opposed Piston Engines: Evolution, Use, and Future Applications*, SAE International, Warrendale Penna., Oct. 2009, Section 3.2: Junkers Jumo 2005; 2010; pp. 55-99.

Pirault, J and Flint, M. *Opposed Piston Engines: Evolution, Use, and Future Applications*, SAE International, Warrendale Penna, Oct. 2009, Section 3.3: Junkers Jurno 2007B2; 2010; pp. 102-119.

Pirault, J and Flint, M. *Opposed Piston Engines: Evolution, Use, and Future Applications*, SAE International, Warrendale Penna., Oct. 2009, Section 7.3: Fairbanks Morse Model 38 OP Engine; 2010; pp. 346-372.

International Search Report & Written Opinion, PCT/US2011/000864, dated Aug. 1, 2011.
International Search Report & Written Opinion, PCT/US2014/019344, dated Jul. 21, 2014.
European Examination Report, dated Aug. 27, 2013 for European Patent Application 11721839.6.
Translation of Office Action dated Nov. 15, 2014, for Chinese patent application No. 2011800247174.
Translation of Office Action dated Jun. 10, 2015, for Chinese patent application No. 201180024717.4.
Translation of Office Action dated Mar. 3, 2015, for Japanese patent application No. 2013-511146.
Translation of Office Action dated Oct. 20, 2015, for Japanese patent application No. 2013-511146.
Non-Final Office Action dated Mar. 2, 2016, for U.S. Appl. No. 14/039,856.
Final Office Action dated Jun. 16, 2016 for U.S. Appl. No. 14/039,856.
EPO Communication pursuant to Article 94(3) EPC dated May 4, 2017 for related EP Patent Application No. 14723518.8.
Translation of Office Action dated Apr. 6, 2017, for Chinese patent application No. 201480010271.3.
Notice of Allowance dated Nov. 20, 2017, for U.S. Appl. No. 15/007,077.
Non-Final Office Action dated Jul. 7, 2017 for U.S. Appl. No. 15/007,077.
Office Action dated Aug. 16, 2017 for Japanese patent application No. 2015-560344.
Machine Translation of WO 2010/012919 A1, cited by the Examiner.
Second Office Action dated Jan. 16, 2018, for Chinese patent application No. 2014800102713.
Examination Report dated Jan. 24, 2018, for European patent application No. 14723518.8.

* cited by examiner

EGR CONSTRUCTIONS FOR OPPOSED-PISTON ENGINES

PRIORITY AND RELATED APPLICATIONS

This application is a continuation of U.S. patent application Ser. No. 14/039,856 filed Sep. 27, 2013, which issued as U.S. Pat. No. 9,410,506 on Aug. 9, 2016, and which is a continuation of U.S. patent application Ser. No. 13/068,679 filed May 16, 2011, which issued as U.S. Pat. No. 8,549,854 on Oct. 8, 2013, and which claims priority to U.S. provisional application for patent 61/395,845 filed May 18, 2010 and to U.S. provisional application for patent 61/401,598 filed Aug. 16, 2010.

BACKGROUND

The field is internal combustion engines. Particularly, the field relates to ported, uniflow-scavenged, opposed-piston engines with exhaust gas recirculation. More particularly, the field includes two-stroke, opposed-piston engines with one or more ported cylinders and uniflow scavenging in which an exhaust gas recirculation (EGR) construction provides a portion of the exhaust gasses produced by the engine for mixture with charge air to control the production of NOx during combustion.

Figure 1:
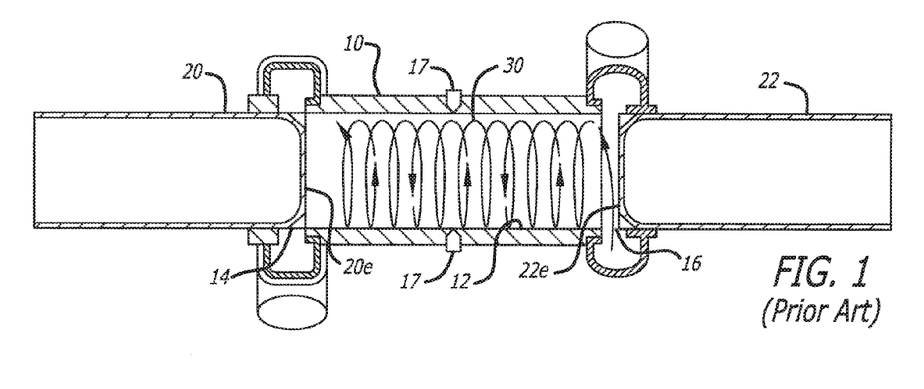
FIG. 1 is a side sectional partially schematic drawing of a cylinder of a prior art opposed-piston engine with opposed pistons near respective bottom dead center locations, and is appropriately labeled "Prior Art".

As seen in FIG. 1, an internal combustion engine is illustrated by way of an opposed-piston engine that includes at least one cylinder 10 with a bore 12 and longitudinally-displaced exhaust and intake ports 14 and 16 machined or formed therein. Fuel injector nozzles 17 are located in or adjacent injector ports that open through the side of the cylinder, at or near the longitudinal center of the cylinder. Two pistons 20, 22 are disposed in the bore 12 with their end surfaces 20e, 22e in opposition to each other. For convenience, the piston 20 is referred as the "exhaust" piston because of its proximity to the exhaust port 14; and, the end of the cylinder wherein the exhaust port is formed is referred to as the "exhaust end". Similarly, the piston 22 is referred as the "intake" piston because of its proximity to the intake port 16, and the corresponding end of the cylinder is the "intake end".

Operation of an opposed-piston engine with one or more cylinders such as the cylinder 10 is well understood. In this regard, and with reference to FIG. 2, in response to combustion occurring between the end surfaces 20e, 22e the opposed pistons move away from respective top dead center (TDC) positions where they are at their closest positions relative to one another in the cylinder. While moving from TDC, the pistons keep their associated ports closed until they approach respective bottom dead center (BDC) positions in which they are furthest apart from each other. The pistons may move in phase so that the exhaust and intake ports 14, 16 open and close in unison. Alternatively, one piston may lead the other in phase, in which case the intake and exhaust ports have different opening and closing times.

In many opposed-piston constructions, a phase offset is introduced into the piston movements. As shown in FIG. 1, for example, the exhaust piston leads the intake piston and the phase offset causes the pistons to move around their BDC positions in a sequence in which the exhaust port 14 opens as the exhaust piston 20 moves through BDC while the intake port 16 is still closed so that combustion gasses start to flow out of the exhaust port 14. As the pistons continue moving away from each other, the intake port 16 opens while the exhaust port 14 is still open and a charge of pressurized air ("charge air") is forced into the cylinder 10, driving exhaust gasses out of the exhaust port 14. The displacement of exhaust gas from the cylinder through the exhaust port while admitting charge air through the intake port is referred to as "scavenging". Because the charge air entering the cylinder flows in the same direction as the outflow of exhaust gas (toward the exhaust port), the scavenging process is referred to as "uniflow scavenging".

Figure 2:
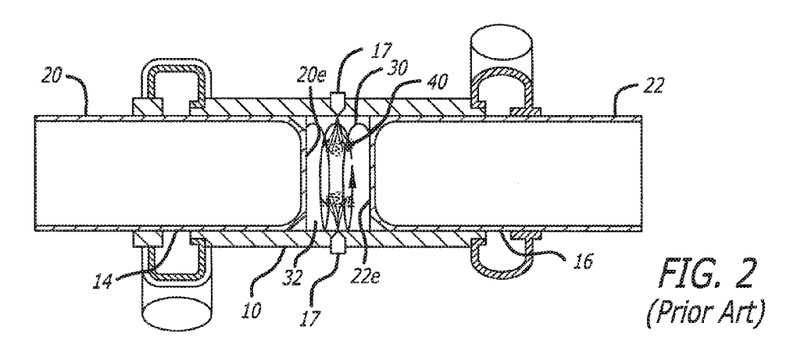
FIG. 2 is a side sectional partially schematic drawing of the cylinder of FIG. 1 with the opposed pistons near respective top dead center locations where end surfaces of the pistons define a combustion chamber, and is appropriately labeled "Prior Art".

As the pistons move through their BDC locations and reverse direction, the exhaust port 14 is closed by the exhaust piston 20 and scavenging ceases. The intake port 16 remains open while the intake piston 22 continues to move away from BDC. As the pistons continue moving toward TDC (FIG. 2), the intake port 16 is closed and the charge air in the cylinder is compressed between the end surfaces 20e and 22e. Typically, the charge air is swirled as it passes through the intake port 16 to promote good scavenging while the ports are open and, after the ports close, to mix the air with the injected fuel. Typically, the fuel is diesel which is injected into the cylinder by high pressure injectors. With reference to FIG. 1 as an example, the swirling air (or simply, "swirl") 30 has a generally helical motion that forms a vortex in the bore which circulates around the longitudinal axis of the cylinder. As best seen in FIG. 2, as the pistons advance toward their respective TDC locations in the cylinder bore, fuel 40 is injected through the nozzles 17 directly into the swirling charge air 30 in the bore 12, between the end surfaces 20e, 22e of the pistons. The swirling mixture of charge air and fuel is compressed in a combustion chamber 32 defined between the end surfaces 20e and 22e when the pistons 20 and 22 are near their respective TDC locations. When the mixture reaches an ignition temperature, the fuel ignites in the combustion chamber, driving the pistons apart toward their respective BDC locations.

As illustrated in FIG. 2, fuel is directly injected through the side of the cylinder ("direct side injection") into the cylinder bore and the movement of the fuel interacts with the residual swirling motion of the charge air in the bore. As the engine operating level increases and the heat of combustion rises, an increasing amount of nitrogen oxide (NOx) is produced. However, increasingly stringent emission requirements indicate the need for a significant degree of NOx reduction. One technique reduces NOx emission by exhaust gas recirculation ("EGR"). EGR has been incorporated into spark-ignited 4-stroke engine constructions and 2-stroke, compression-ignition engines with a single piston operating in each cylinder. However, such EGR constructions are not immediately applicable to 2-stroke, opposed-piston engines with uniflow scavenging because of the need to generate a pressure differential that pumps the exhaust gas into the inflowing stream of air in an opposed-piston engine. Therefore, there is a need for effective EGR constructions that are adapted to the designs and operations of 2-stroke opposed-piston engines with uniflow scavenging.

SUMMARY

A solution to the problem is to reduce the NOx emissions of a two-stroke opposed-piston engine with uniflow scavenging by exhaust gas recirculation through one or more ported cylinders of the engine. The engine includes at least one cylinder with piston-controlled exhaust and intake ports and a charge air channel to provide charge air to at least one intake port of the engine.

In one aspect, EGR is provided by an EGR loop having an input coupled to an exhaust port of the cylinder and a loop output coupled to the charge air channel. A pressure differential provided between the exhaust gas and the charge air channel causes the exhaust gas to flow through the EGR loop to the charge air channel where exhaust gas and air are mixed and provided to the at least one intake port.

In another aspect, EGR is provided by retention of residual exhaust gasses in the ported cylinder when scavenging ceases.

DETAILED DESCRIPTION OF THE PREFERRED EMBODIMENTS

The EGR constructions described in this specification are presented in an explanatory context that includes a ported, uniflow-scavenging internal combustion engine having at least one cylinder in which a pair of pistons is disposed with their end surfaces in opposition. A "ported" cylinder includes one or more of intake and exhaust ports formed or machined in a sidewall thereof. This explanatory context is intended to provide a basis for understanding various EGR construction embodiments by way of illustrative examples.

Figure 3:
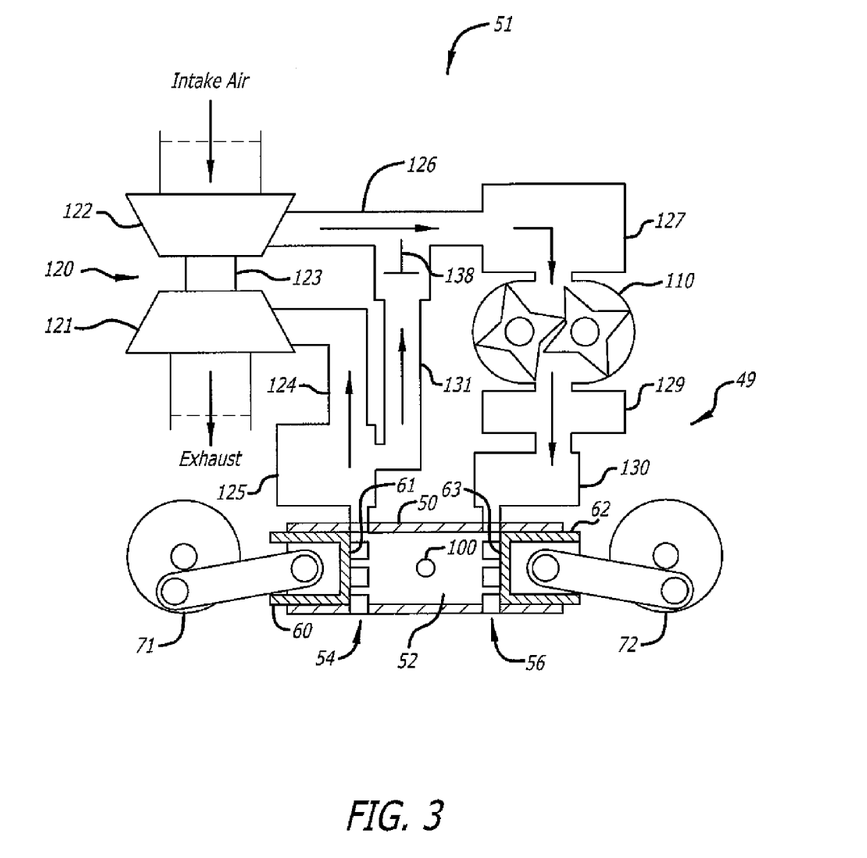
FIG. 3 is a conceptual schematic diagram of an internal combustion engine of the opposed-piston type in which aspects of an air management system with EGR are illustrated.

In FIG. 3, an internal combustion engine 49 is embodied by an opposed-piston engine having at least one ported cylinder 50. For example, the engine may have one ported cylinder, two ported cylinders, three ported cylinders, or four or more ported cylinders. For purposes of illustration, in the examples to be illustrated and described the engine is an engine of the opposed-piston type that is presumed to have a plurality of ported cylinders. In this regard, each cylinder 50 has a bore 52 and exhaust and intake ports 54 and 56 formed or machined in respective ends thereof. The exhaust and intake ports 54 and 56 each include one or more circumferential arrays of openings in which adjacent openings are separated by a solid bridge. (In some descriptions, each opening is referred to as a "port"; however, the construction of a circumferential array of such "ports" is no different than the port constructions shown in FIG. 3.) Exhaust and intake pistons 60 and 62 are slidably disposed in the bore 52 with their end surfaces 61 and 63 opposing one another. The exhaust pistons 60 are coupled to a crankshaft 71, the intake pistons are coupled to the crankshaft 72.

When the pistons 60 and 62 of a cylinder 50 are at or near their TDC positions, a combustion chamber is defined in the bore 52 between the end surfaces 61 and 63 of the pistons. Fuel is injected directly into the combustion chamber through at least one fuel injector nozzle 100 positioned in an opening through the sidewall of a cylinder 50.

With further reference to FIG. 3, the engine 49 includes an air management system 51 that manages the transport of charge air provided to, and exhaust gas produced by, the engine 49. A representative air management system construction includes a charge air subsystem and an exhaust subsystem. In the air management system 51, the charge air subsystem includes a charge air source that receives intake air and processes it into charge air, a charge air channel coupled to the charge air source through which charge air is transported to the at least one intake port of the engine, and at least one air cooler in the charge air channel that is coupled to receive and cool the charge air (or a mixture of gasses including charge air) before delivery to the intake port or ports of the engine. Such a cooler can comprise an air-to-liquid and/or an air-to-air device, or another cooling device. Hereinafter, such a cooler is denoted as a "charge air cooler". The charge air subsystem also includes a supercharger that pumps charge air in the charge air channel to intake ports of the engine. The exhaust subsystem includes an exhaust channel that transports exhaust products from exhaust ports of the engine to an exhaust pipe.

With reference to FIG. 3, the preferred charge air subsystem includes a supercharger 110, which can be driven by an electrical motor, or by a gear, chain, or belt apparatus coupled to a crankshaft. For example, but without limitation, in FIGS. 4, 5, and 6 the supercharger 110 is coupled by a belt linkage to the crankshaft 72 to be driven thereby. The supercharger 110 can be a single-speed or multiple-speed device, or a fully variable-speed device. Preferably, but not necessarily, the air management system 51 includes a turbocharger 120 with a turbine 121 and a compressor that rotate on a common shaft 123. The turbine 121 is coupled to the exhaust subsystem and the compressor 122 is coupled to the charge air subsystem. The turbine 121 can be a fixed-geometry or a variable-geometry device. The turbo-charger 120 extracts energy from exhaust gas that exits the exhaust ports 54 and flows into the exhaust channel 124 directly from the exhaust ports 54, or from an exhaust manifold 125. In this regard, the turbine 121 is rotated by exhaust gas passing through it. This rotates the compressor 122, causing it to generate charge air by compressing intake air. The charge air output by the compressor 122 flows through a conduit 126 to a charge air cooler 127, whence it is pumped by the supercharger 110 to the intake ports. Air compressed by the supercharger 110 is output from the supercharger through a charge air cooler 129 to an intake manifold 130. The intake ports 56 receive charge air pumped by the supercharger 110, through the intake manifold 130. Preferably, but not necessarily, in multi-cylinder opposed-piston engines, the intake manifold 130 is constituted of an intake plenum that communicates with the intake ports 56 of all cylinders 50.

Exhaust Gas Management:

It is desirable to modify or adapt an air management construction for an internal combustion engine of the ported-cylinder type in order to reduce NOx emissions produced by combustion. It is particularly desirable to control such emissions by recirculating exhaust gas through the ported cylinders of an opposed-piston engine. The recirculated exhaust gas is mixed with charge air to lower peak combustion temperatures, which lowers NOx emissions. This process is referred to as exhaust gas recirculation ("EGR"). An EGR construction can utilize exhaust gasses transported in an EGR channel external to the cylinder into the incoming stream of fresh intake air as per the valve-controlled recirculation channel 131 in FIG. 3. Alternatively, or additionally, an EGR process can utilize residual exhaust gasses that are retained in the cylinders 50 when scavenging ceases. In the case of external EGR, the exhaust gas is pumped into the inflowing stream of air. A source of pressure in communication with the EGR channel creates a pressure differential that causes exhaust gas to flow through the EGR channel into the charge air subsystem. In some aspects, a virtual pump exists when the exhaust gas to be recirculated is obtained from a source guaranteed to be at a higher pressure than the point where it is fed into the intake stream of charge air. In other aspects, an active pump, such as the supercharger 110, is used to pump the exhaust gas to be recirculated into the charge air that the supercharger is pumping to the intake ports. In these aspects, use of a supercharger provides an additional variable for controlling EGR operations in an opposed-piston engine. In some aspects recirculated exhaust gas is cooled by way of one or more EGR coolers, which can comprise air-to-liquid and/or air-to-air devices. In other aspects, recirculated exhaust gas is cooled by one or more charge air coolers alone or in combination with one or more EGR coolers.

Figure 4:
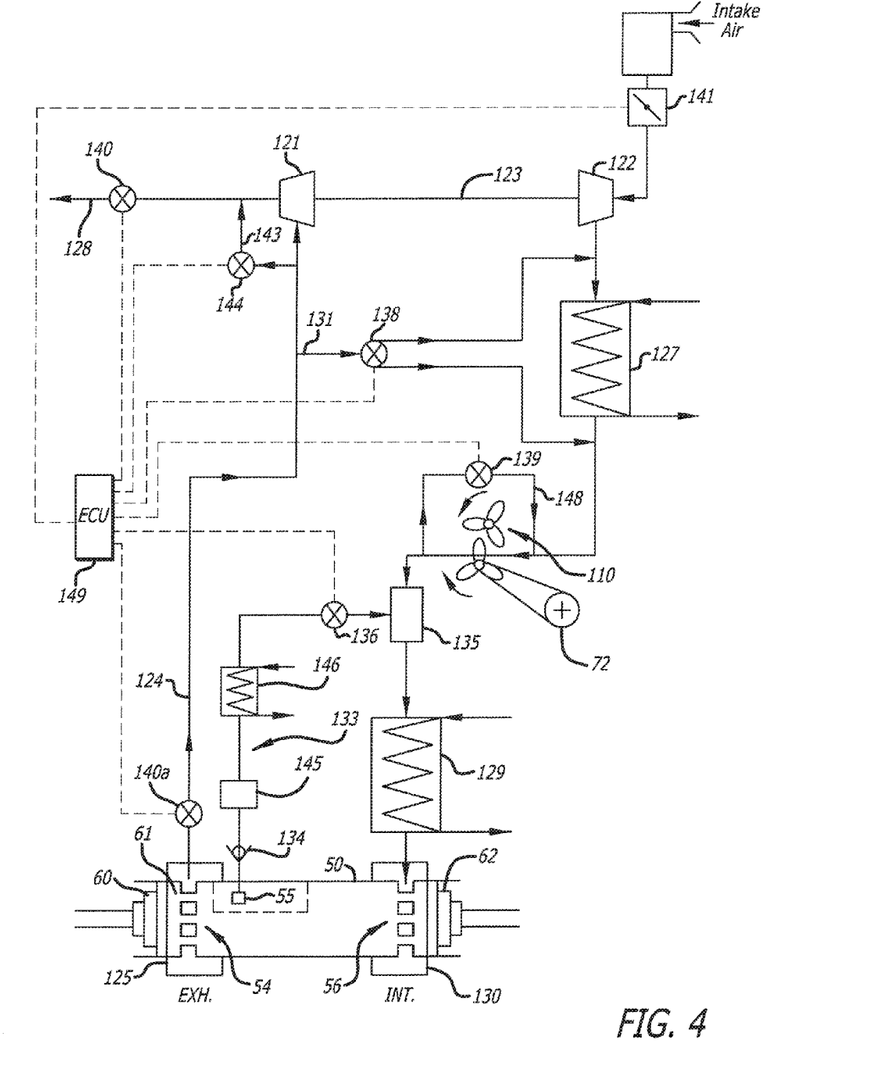
FIG. 4 is a conceptual schematic drawing illustrating preferred constructions for EGR in the ported, uniflow scavenging, internal combustion engine of FIG. 3.

First EGR Loop Construction:

In some aspects, the internal combustion engine seen in FIG. 3 includes a first EGR loop construction. With reference to FIG. 4, a first EGR loop construction for a uniflow scavenging, ported, opposed-piston application circulates exhaust gas from any source of exhaust gas exiting from one or more cylinders. For example, but without excluding other exhaust gas sources, the first EGR loop construction includes an EGR port 55 positioned inboard of exhaust port 54; that is to say, the EGR port 55 is positioned between the exhaust port 54 and the longitudinal midpoint of the cylinder 50. The EGR port construction includes one or more port openings as needed by any particular design. In response to combustion, while moving toward BDC, the exhaust piston 60 moves past the EGR port 55, opening the EGR port to a cylinder bore pressure that is guaranteed to be higher than the pressure in the intake manifold 130. This pressure differential pumps a portion of exhaust gas from the EGR port 55 through a plenum or manifold (not shown) into a conduit 133 controlled by a one-way check valve 134, and then into the intake manifold 130 where it is mixed with the charge air and recirculated therewith into the cylinder bore. Preferably, but not necessarily, the exhaust gas enters the charge air output by the supercharger 110 prior to the inlet of the charge air cooler 129. It is desirable that the ratio of the cylinder pressure when the EGR port opens ("EGR open") to the intake manifold pressure not exceed a threshold value beyond which choked flow conditions may occur in the one-way check valve 134. This pressure ratio is affected by the size of the EGR port and its location with respect to the longitudinal center of the cylinder (the closer to the center, the higher the pressure) as well as the state of the air charge system (boost, turbine back pressure, etc.).

With further reference to FIG. 4, in a variant of the first loop EGR construction, the exhaust gas flowing in the conduit 133 is mixed with charge air output by the supercharger 110 through a mixer 135 that can be constituted, for example, as a venturi. The exhaust gas is input to the mixer 135 through a valve 136; pressurized charge air output by the supercharger 110 is provided to a mixing input of the mixer 135. The mixture of pressurized charge air and exhaust gas produced by the mixer 135 is provided to the input of the charge air cooler 129 (or, alternately, to the input of the charge air cooler 127). The valve 136 is operated by a signal output by an engine control unit (ECU) 149.

In some aspects it is desirable to dampen fluctuations in the flow of exhaust gas. In such a case and with reference to FIG. 4, an accumulator 145 is provided in the first loop in series between the EGR port 55 and the input to the valve 136. In some other aspects, it is desirable to cool the exhaust gas before mixing it with charge air. In such a case, an EGR cooler 146 is provided in the first loop in series between the check valve 134 and the input to the valve 136. Alternatively, the loop construction can be 134, 136, 146. In the case where both the EGR accumulator 145 and the cooler 146 are used, it is preferred, but not required, that the EGR cooler 146 be positioned in series between the output of the EGR accumulator 145 and the input to the valve 136.

Second EGR Loop Construction:

In some aspects, the internal combustion engine 49 seen in FIG. 3 can include another EGR loop construction. With reference to FIGS. 3 and 4, a second EGR loop construction includes the conduit 131 and a valve 138 to shunt a portion of the exhaust gas from the exhaust manifold 54 to the input of a charge air cooler so that the portion is cooled. In order to promote optimal exhaust gas/charge air mixing, it is desirable to add a device through which the exhaust gasses and the charge air flow together and mix. When it is desirable to introduce the exhaust gas into the charge air at a location that is remote from the intake manifold 130, the exhaust gas portion is shunted to the input of the charge air cooler 127. This loop subjects the exhaust gas to the cooling effects of two charge air coolers (127 and 129). If less cooling is merited, the valve 138 can be constituted as a three-way valve (as best seen in FIG. 4), and the exhaust gas portion can be shunted around the cooler 127 to the input of the supercharger 110. This alternative subjects the exhaust gas portion to cooling by only the charge air cooler 129. A dedicated EGR cooler that cools only exhaust gas can be incorporated into the second loop, if needed. For example, an EGR cooler can be placed in the conduit 131, in series with the valve 138, or in series with the output port of the valve 138 and the input to the supercharger 110. In some aspects, the valve 138 is constituted as a single three-way device. Alternatively, the valve 138 is constituted as a pair of valves, each in a respective branch of a Y-connection from the conduit 131, in which one valve controls the provision of exhaust gas to the input of the cooler 127 and the other controls the provision of exhaust gas to the input of the supercharger 110.

EGR Using Retained Exhaust Gas:

In a uniflow or loop-scavenged internal combustion engine, it is sometimes desirable to trap or retain a residual amount of exhaust gas in a cylinder after scavenging ceases. The residual exhaust gas can be used to adjust the initial conditions for combustion to a point advantageous for reducing NOx emissions. Depending on the configuration of the turbo-machinery, at low and medium speeds and loads, uniflow-scavenged engines may exhibit incomplete scavenging. Since the residual exhaust gas inside the cylinder is hot, the resulting temperature of the new charge of air may be substantially elevated, therefore this method is best suited for reducing NOx under partial engine load conditions.

The amount of charge air that is fed into a cylinder each cycle can be used to alter the amount of residual exhaust gas left in the cylinder. In this regard, adjusting the amount of charge air that is fed into the cylinder in any given cycle of operation can be used to "tune" the amount of exhaust gas retained in the cylinder for the next combustion occurrence. In one aspect of retained exhaust gas EGR, seen in FIG. 4, a bypass conduit loop 148 including a valve 139 is placed in parallel with the supercharger 110. The valve 139 is operated to control the amount of charge air pumped into the engine by the supercharger 110. Setting the amount of charge air pumped allows control of the amount of exhaust gas scavenged, and, consequently, the amount of exhaust gas retained in any cylinder following scavenging. In this regard, if a high manifold pressure is desired (as would be indicated for high engine load conditions) the valve 139 is fully shut and charge air is delivered to the engine at a high rate. As the valve 139 is increasingly opened, an increasing amount of charge air pumped by the supercharger 110 is returned to the inlet of the supercharger, which proportionately reduces the amount of charge air delivered to the engine. Thus, the charge air/fuel ratio is reduced and the amount of exhaust gas retained in any cylinder is increased. Among the benefits realized by this aspect of retained exhaust gas EGR are NOx reduction and reduction of pumping load imposed on the engine by the supercharger 110.

An increase in the pressure felt by exhaust gas flowing to the turbine ("backpressure") can also be used to alter the amount of residual exhaust gas left in the cylinder. In this regard, adjusting the amount of backpressure in any given cycle of operation can be used to "tune" the amount of residual exhaust gas for the next combustion occurrence. Therefore, in another aspect of retained exhaust gas EGR, seen in FIG. 4, a variable valve 140 is placed in series with exhaust gas output. The setting of the valve 140 directly influences the backpressure felt upstream of the valve and, consequently, the amount of exhaust gas retained in any cylinder after scavenging. In FIG. 4, the valve 140 is placed in series with the output of the turbine 121. In this case, any backpressure resulting from the setting of the valve is distributed over all cylinders of the engine. In an alternative aspect, an equivalent valve 140a can be placed in series between the input to the turbine 121 and an exhaust manifold that collects the exhaust output of one or more cylinders. In yet another alternative aspect, the equivalent valve 140a can be placed in series with an exhaust manifold or exhaust port of each of a plurality of cylinders.

Turbine Bypass Construction:

Referring again to FIG. 4, a bypass conduit loop 143 including a valve 144 is placed in parallel with the turbine 121. The valve 144 is operated to control the amount of exhaust gas flowing from the engine into the turbine 121. Setting the valve 144 to bypass the turbine 121 allows exhaust energy to be dumped into the exhaust pipe 128 without operating the turbine 121 and compressor 122. This keeps the exhaust gas at a higher temperature level and increases after-treatment conversion efficiencies (for particulate filters and catalytic devices, for example) at engine warm-up during partial engine load conditions such as from a cold start. Further, setting the valve 144 to bypass the turbine 121 during engine operation under partial engine load conditions reduces turbo-charger operation, and allows more exhaust gas to be driven over the supercharger 110 (via valve 138, for example) while also delivering exhaust gas at a higher temperature to the exhaust pipe 128 to increase after-treatment conversion efficiencies. Another construction for varying the amount of exhaust gas flowing from the engine into the turbine 121 includes a turbine with a variable geometry construction to control pressure in the exhaust conduit 124, upstream of the valve 144. Using a variable geometry turbine (VGT) instead of a fixed geometry turbine does not necessarily eliminate the need for a turbine bypass valve such as the valve 144. A VGT has only a limited mass flow range where it works at acceptable efficiencies. Outside this range, a turbine bypass valve can be used to control the mass flow and intake pressure of the engine 49.

Figure 5:
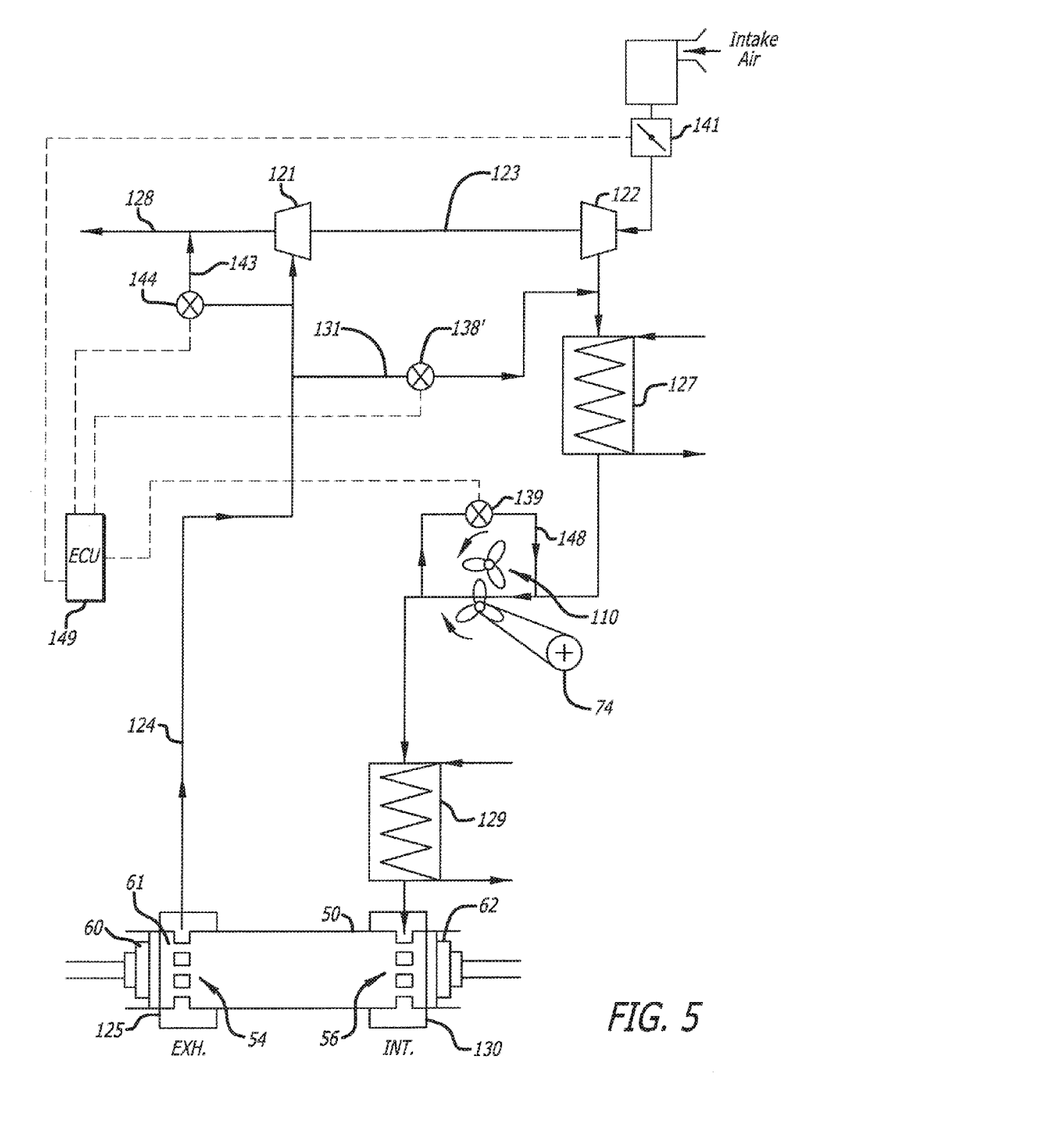
FIG. 5 is a schematic drawing of a preferred EGR construction for the ported, uniflow scavenging, internal combustion engine of FIG. 3.

Preferred EGR Embodiment:

A preferred EGR construction for a ported opposed-piston engine with uniflow scavenging is shown in FIG. 5. In the preferred construction, exhaust gas flows from the exhaust port or ports 54 of the engine, through the conduit 124 to the turbine 121, whence it passes through after-treatment conversion (not shown) and flows out the exhaust pipe 128. Preceding the input to the turbine 121, a portion of the exhaust gas is shunted from the conduit 124 via 131 and from there through the valve 138' to the input of the charge air cooler 127 where it mixes with the incoming stream of fresh air. The exhaust gas and air are mixed and cooled in the charge air cooler 127, and the cooled gas/air mixture is input to the supercharger 110. The supercharger 110 compresses the gas/air mixture, and the compressed mixture is input to the charge air cooler 129. The cooled, compressed mixture then enters the cylinder 50 via the intake port 56. Optionally, the intake throttle valve 141 and the turbine bypass valve 144 are included for high precision control of the ratio of recirculated exhaust gas to fresh air.

Exhaust Configuration and Control:

The EGR and turbine bypass constructions illustrated in FIGS. 4 and 5 can be implemented in a ported engine of the uniflow scavenging type singly, or in any combination of two or more constructions, or portions thereof, as required for a specific design. One example is an EGR configuration in which uncooled exhaust gas retained in a cylinder following scavenging is combined or mixed with recirculated exhaust gas that is cooled and mixed with charge air provided to the cylinder. The relative amounts of retained and recirculated exhaust gas can be varied in order to precisely control the EGR rate and temperature. An intake throttle valve 141 can be placed in the stream of fresh air flowing into the compressor 122 in order to more precisely control the ratio of recirculated exhaust gas to fresh air. If implemented on a per-cylinder basis, a high-speed individual EGR and charge air/fuel trim is provided to correct cylinder-to-cylinder variations caused by flow dynamics and/or manufacturing tolerances.

An EGR control process for an EGR system that utilizes one or more of the constructions illustrated in FIGS. 4 and 5, or any combination thereof, is executed by the ECU 149 in response to specified engine operating conditions by automatically operating any one or more of the valves 136, 138, 139, 140, 140a, and 144, the intake throttle valve 141, and the supercharger 110, if a multi-speed or variable speed device is used, and the turbo-charger 120, if a variable-geometry device is used. Of course, operation of valves, throttles, and associated elements used for EGR can include any one or more of electrical, pneumatic, mechanical, and hydraulic actuating operations. For fast, precise automatic operation, it is preferred that the valves be high-speed, computer-controlled devices with continuously-variable settings. Each valve has a first state in which it is open (to some setting controlled by the ECU 149) to allow gas to flow through it, and a second state in which it is closed to block gas from flowing through it.

Preferably an EGR control process automatically operates an EGR system incorporating one or more constructions described and illustrated herein based upon one or more parameters relating to recirculated exhaust gas and to a mixture of recirculated exhaust gas and charge air. Parameter values are determined by a combination of one or more of sensors, calculations, and table lookup so as to manage the values of individual parameters and one or more ratios of EGR and mixture parameters in one or more cylinders.

Figure 6:
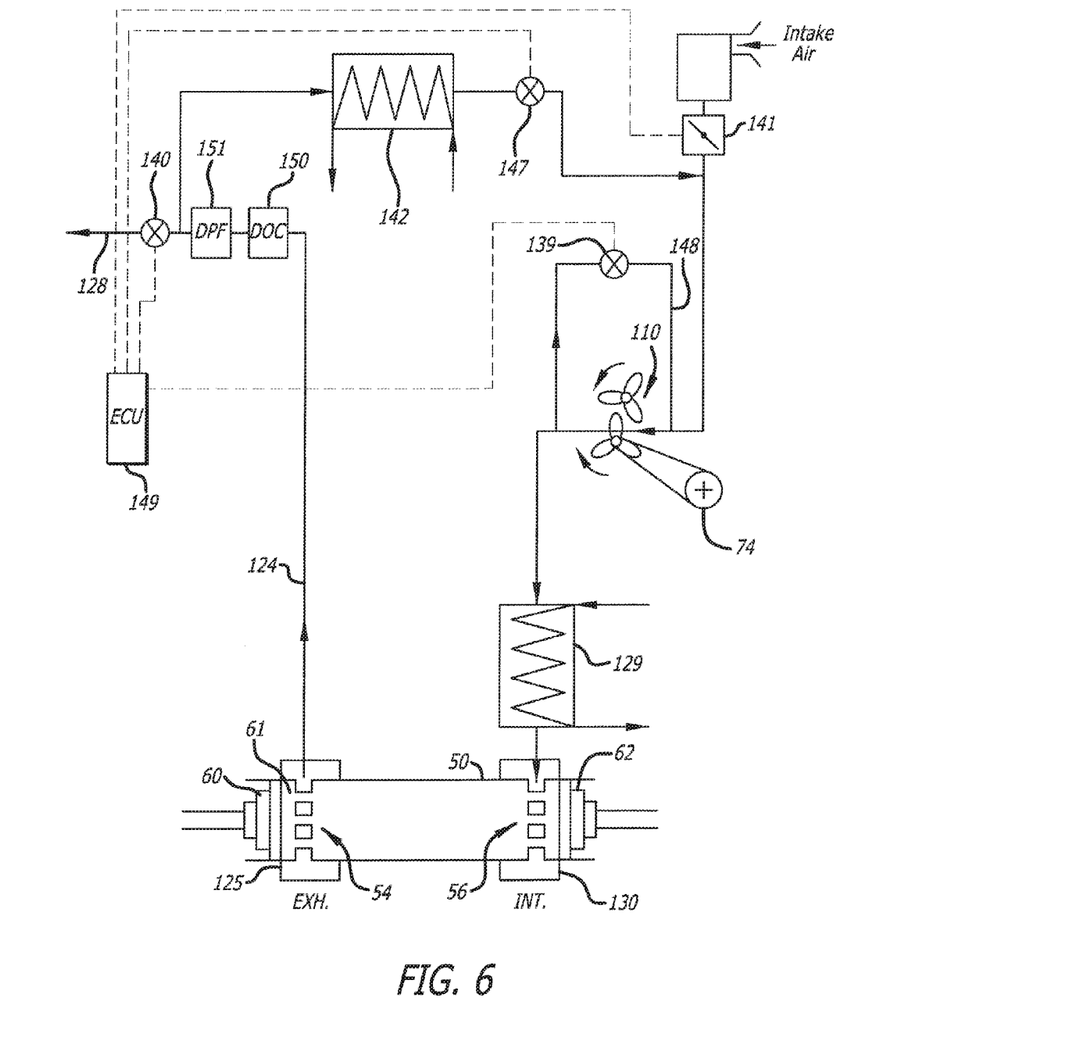
FIG. 6 is a schematic drawing of an alternate EGR construction for a ported, uniflow scavenging, opposed-piston engine without a turbocharger.

Alternate EGR Embodiment:

An alternate EGR construction is shown in FIG. 6 in a two-stroke opposed-piston engine with ported cylinders and uniflow scavenging in which only a supercharger provides scavenging pressure. Presume that after-treatment conversion is implemented by emission control devices that include a diesel oxidation catalyst (DOC) to reduce CO and hydrocarbons, a diesel particulate filter (DPF) to reduce soot emissions and a selective catalytic reduction device to reduce NOx emissions. All of these devices require addition of heat for operation, and the absence of a turbocharger reduces the competition for heat derived from exhaust gas, while also lowering the power density of the engine. Moreover, the DPF and DOC now can be closely coupled at an exhaust manifold, where a turbocharger typically is mounted. Furthermore, elimination of a turbocharger and its required ducting reduces the size of the opposed-piston engine and also reduces the loss of exhaust heat by convection from the turbocharger housing and ducting. Preferably, although not necessarily, exhaust gas for recirculation is extracted from the outlet of the DPF where it is free of particulates and can be cooled and plumbed to the inlet of the supercharger. Although the exhaust gas is cooler after the DPF, it can be cooled further with an EGR cooler.

The alternate EGR embodiment for a two-stroke, ported, uniflow-scavenging, opposed-piston engine is illustrated in FIG. 6. Preferably, the engine does not include a turbocharger. Exhaust gas flows from the exhaust manifold 125, through the conduit 124, through the DOC 150 and the DPF 151, then through the valve 140 and out the exhaust pipe 128. A portion of the exhaust gas is diverted by a pressure change determined by the setting of the valve 140 into the input of an EGR cooler 142. Cooled exhaust gas output by the EGR cooler 142 is metered through a valve 147 into the air stream entering the supercharger 110. The intake throttle valve 141 can be placed in the airstream flowing to the supercharger, upstream of the output of the valve 147, in order to more precisely control the ratio of recirculated exhaust gas to air by creating a slight vacuum. Since the alternate EGR loop is being drawn through the supercharger 110, the time needed to empty the exhaust gas from the charge air cooler 129 is much reduced, thereby improving the transient response. If the supercharger 110 is driven directly from the engine, it will achieve high flow and high speed together with the engine. The supercharger capacity enables the needed exhaust gas to be pumped as required at high engine speed and load as required to meet stringent emission requirements. The supercharger bypass valve 139 permits the pressure produced by the supercharger to be continuously varied.

Although EGR constructions have been described with reference to a ported opposed engine construction with two crankshafts, it should be understood that various aspects of these constructions can be applied to opposed-piston engines with one or more crankshafts. Moreover, various aspects of these EGR constructions can be applied to opposed-piston engines with ported cylinders disposed in opposition, and/or on either side of one or more crankshafts. Accordingly, the protection afforded to these constructions is limited only by the following claims.

We claim:

1. A method of operating an exhaust gas recirculation (EGR) system of a ported, uniflow-scavenged, opposed-piston engine including one or more cylinders and a turbocharger with a turbine and a compressor, in which charge air is generated by compressing intake air in the compressor and then cooled in at least one charge air cooler and provided to an intake port of each of the one or more cylinders, the method comprising:

flowing the charge air generated by the compressor to an input of the at least one charge air cooler;

providing engine exhaust gas through an exhaust gas recirculation (EGR) loop to the input of the at least one charge air cooler; and retaining residual engine exhaust gas remaining in the one or more cylinders after scavenging ceases, during low engine load conditions, by one or more of decreasing charge air pressure and increasing exhaust gas back pressure.

2. The method of claim 1, in which providing the engine exhaust gas through an EGR loop to the input of the at least one charge air cooler includes pumping the engine exhaust gas through the EGR loop with a supercharger disposed between the at least one charge air cooler and the at least one intake port; and in which the method further comprises:

cooling a mixture of the recirculated engine exhaust gas and the pressurized charge air in the at least one charge air cooler;

inputting the cooled mixture to the supercharger;

compressing the cooled mixture in the supercharger; and, providing the compressed, cooled mixture to one or more intake ports of the engine.

3. A method of operating an exhaust gas recirculation (EGR) system of a ported, uniflow-scavenged, opposed-piston engine including one or more cylinders and a turbocharger with a turbine and a compressor, in which charge air is generated by compressing intake air in the compressor and then cooled in at least one charge air cooler and provided to an intake port of each of the one or more cylinders, the method comprising:

flowing the charge air generated by the compressor to an input of the at least one charge air cooler;

providing engine exhaust gas through an exhaust gas recirculation (EGR) loop to the input of the at least one charge air cooler;

providing the engine exhaust gas to the turbine; and controlling an amount of the engine exhaust gas provided to the turbine through a bypass conduit loop including a settable valve disposed in parallel with the turbine.

4. The method of claim 3, in which controlling the amount of engine exhaust gas provided to the turbine includes controlling after-treatment conversion efficiencies during engine cold start conditions by setting the valve to bypass the turbine.

5. The method of claim 3, in which providing the engine exhaust gas through an EGR loop to the input of the at least one charge air cooler includes pumping the engine exhaust gas through the EGR loop with a supercharger disposed between the at least one charge air cooler and the at least one intake port; and in which the method further comprises:

cooling a mixture of the recirculated engine exhaust gas and the pressurized charge air in the at least one charge air cooler;

inputting the cooled mixture to the supercharger;

compressing the cooled mixture in the supercharger; and, providing the compressed, cooled mixture to one or more intake ports of the engine.

6. A method of operating an exhaust gas recirculation (EGR) system of a ported, uniflow-scavenged, opposed-piston engine including one or more cylinders and a turbocharger with a turbine and a compressor, in which charge air is generated by compressing intake air in the compressor and then cooled in at least one charge air cooler and provided to an intake port of each of the one or more cylinders, the method comprising:

flowing the charge air generated by the compressor to an input of the at least one charge air cooler; and     providing engine exhaust gas through an exhaust gas recirculation (EGR) loop to the input of the at least one charge air cooler;

in which providing the engine exhaust gas through an EGR loop to the input of the at least one charge air cooler includes pumping the engine exhaust gas through the EGR loop with a supercharger disposed between the at least one charge air cooler and the at least one intake port; and     in which the method further comprises:

cooling a mixture of the recirculated engine exhaust gas and the pressurized charge air in the at least one charge air cooler;

inputting the cooled mixture to the supercharger;

compressing the cooled mixture in the supercharger; and         providing the compressed, cooled mixture to one or more intake ports of the engine.

\* \* \* \* \*